Jan. 18, 1949.  N. A. CHRISTENSEN  2,459,148
FLUID CONTROL APPARATUS
Filed Sept. 20, 1944  3 Sheets-Sheet 1
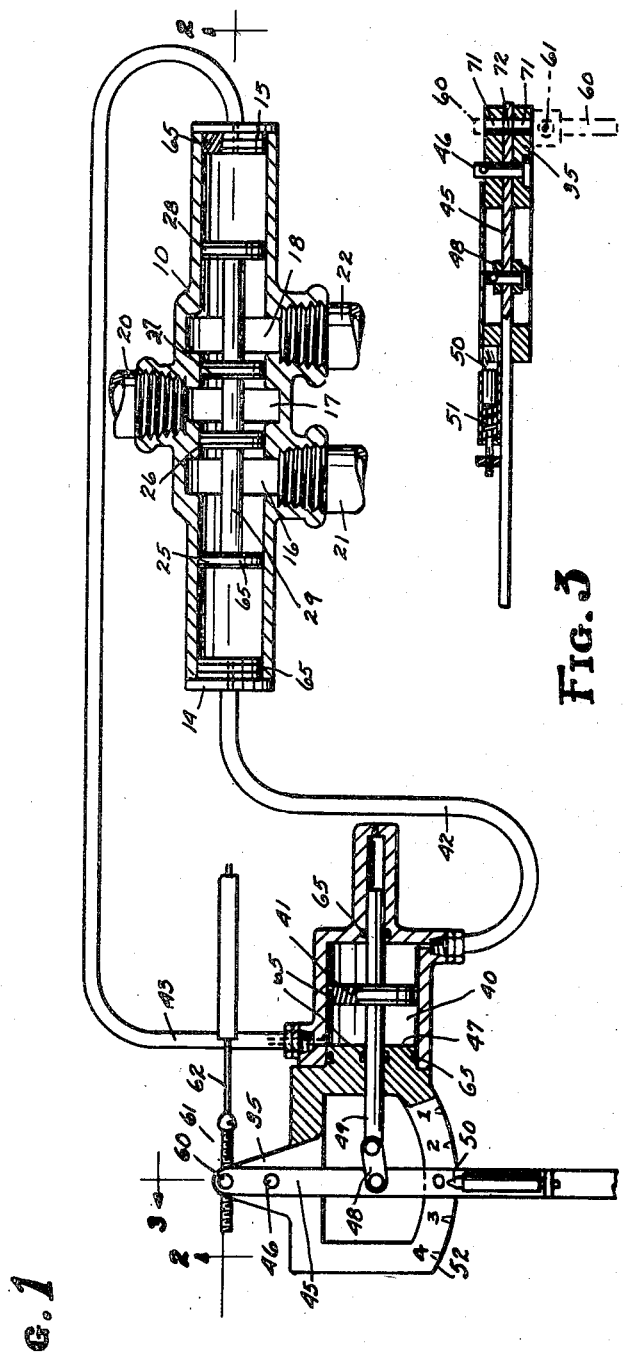
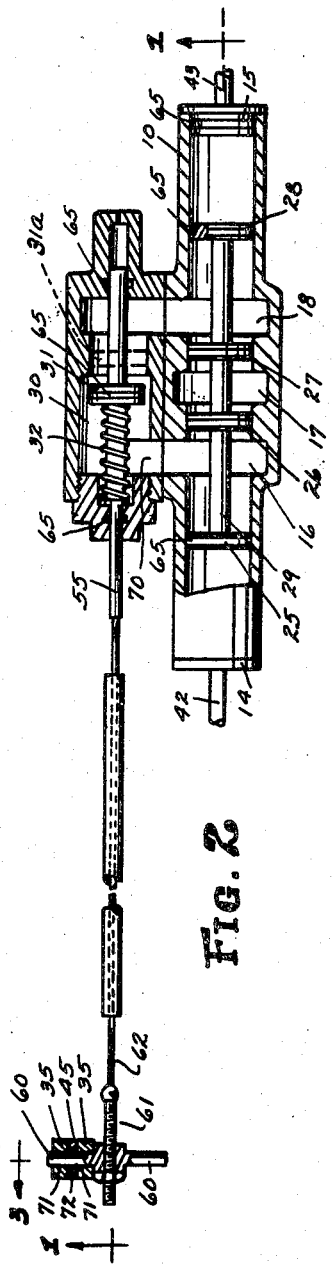
INVENTOR.
NIELS A. CHRISTENSEN
BY Bates, Teare & McBean
ATTORNEYS.

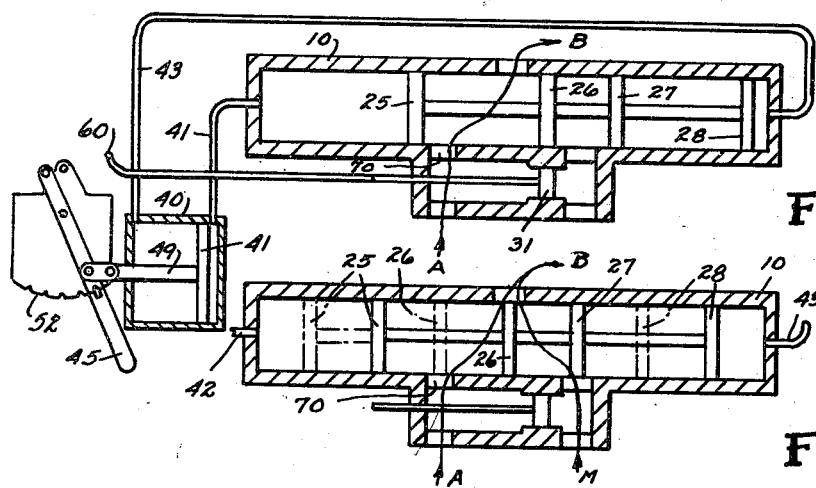
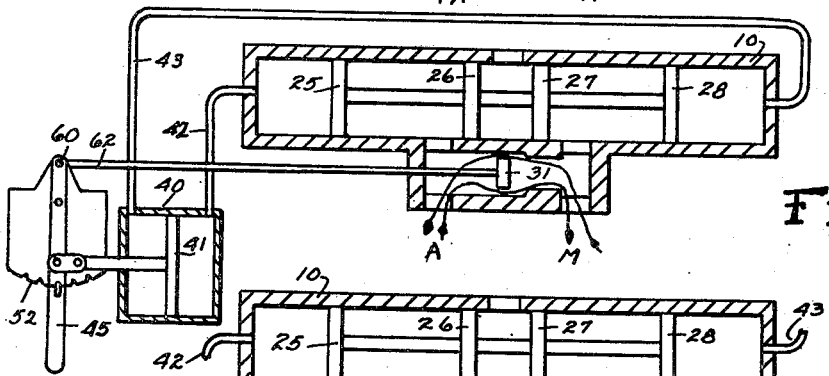
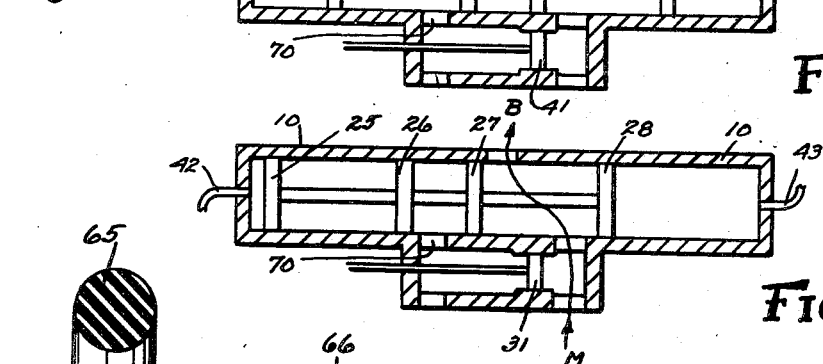
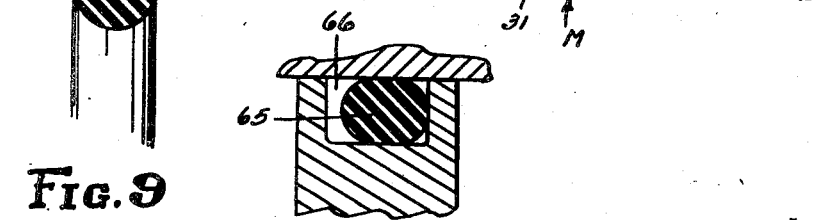

Jan. 18, 1949.   N. A. CHRISTENSEN   2,459,148
FLUID CONTROL APPARATUS
Filed Sept. 20, 1944                           3 Sheets-Sheet 3
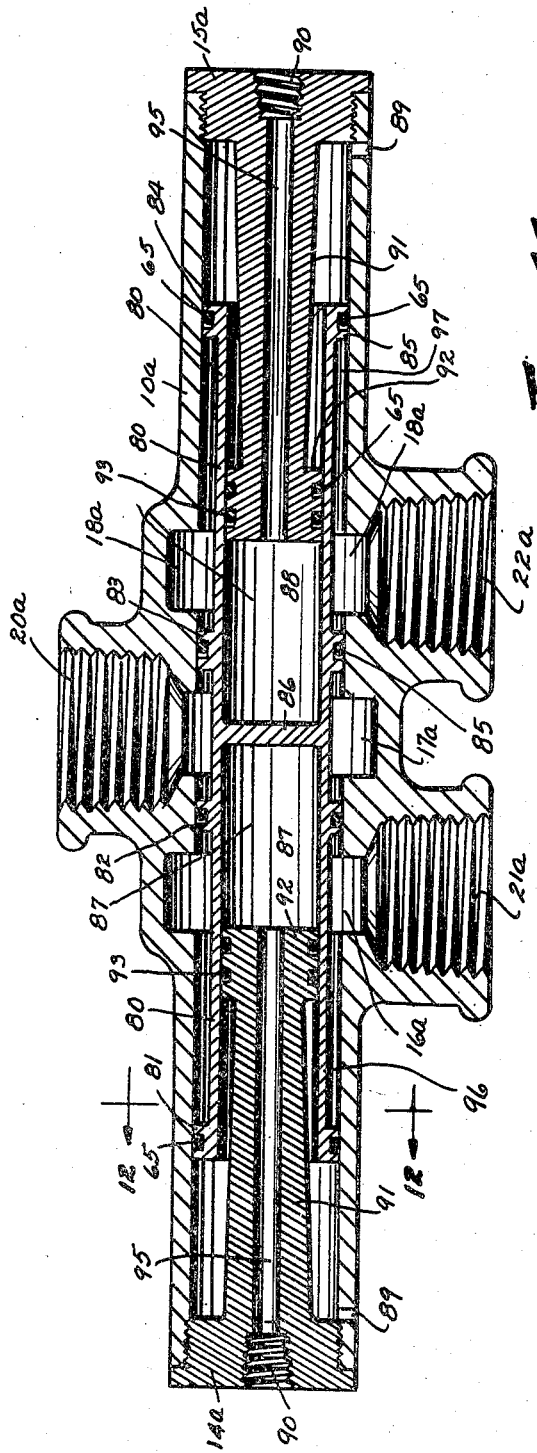
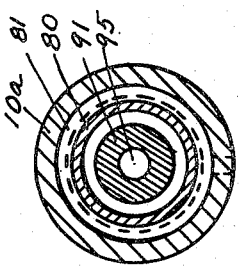
INVENTOR.
NIELS A. CHRISTENSEN
BY
Bates, Teare, & McBean
ATTORNEYS Patented Jan. 18, 1949

2,459,148

UNITED STATES PATENT OFFICE 2,459,148

FLUID CONTROL APPARATUS

Niels A. Christensen, South Euclid, Ohio

Application September 20, 1944, Serial No. 554,949

3 Claims. (Cl. 137—139)

This application is a continuation in part of my copending application, Serial No. 494,749, filed July 14, 1943, for an apparatus and system for fluid control, the present invention being concerned especially with the valve mechanism in such a system.

In my copending application aforesaid, I have illustrated, described and claimed, a system for controlling the fuel in an airplane, wherein there are a plurality of engines and a plurality of fuel supply tanks, wherein the object was set forth as the provision of a system whereby the pilot could quickly supply fuel to any engine or combination of engines from any tank or combination of tanks.

The present invention is the provision of a system designed particularly for use with a single engine and a plurality of supply tanks, and an object is to permit a pilot to supply fuel to the engine from any one of a plurality of tanks or to transfer fuel from one tank to another without requiring the pilot to leave his position and without necessitating complex equipment and extensive piping arrangement within the cockpit of the airplane.

A still further object is to provide simple means effectively preventing intermingling of oil and gas in case of leakage past any of the packings of the valve mechanism.

My invention is illustrated in the drawings hereof in which Sheets 1 and 2 are identical with Sheets 2 and 3 respectively of my said parent application, and Sheet 3 discloses the additional feature of means to prevent intermingling or possible leakage.

In the drawings, Fig. 1 is an assembly diagram partly in section illustrating the general features of my control apparatus; Fig. 2 is a section taken on a plane indicated by the line 2—2 on Fig. 1; Fig. 3 is a section taken on a plane indicated by the line 3—3 on Fig. 1; Figs. 4 to 8 inclusive are diagrammatic views illustrating different positions of the selector valve, for the purpose of illustrating the flow of fuel from different tanks to an engine or from one tank to another tank; Fig. 9 is a section taken on a scale larger than that of Fig. 1 and illustrates the sealing ring used in the valve mechanism; Fig. 10 is a section illustrating the use of the sealing member of Fig. 9; Fig. 11 is a longitudinal axial section through my valve mechanism when provided with means to prevent intermingling or leakage; Fig. 12 is a cross section in a plane indicated by the line 12—12 on Fig. 11.

Referring first to Figs. 1, 2 and 3, 10 indicates in general my selector valve which comprises a cylinder having end walls 14 and 15, and having enlarged portions 16, 17 and 18, respectively, in the region of the connection to the conduits 21, 20 and 22, respectively. A valve unit is disposed within the chamber and comprises a plurality of pistons indicated at 25, 26, 27 and 28 as being rigidly mounted upon a piston rod 29. The rod terminates at the end pistons 25 and 28, and the pistons are so spaced upon the rod that movement thereof as a unit within the chamber will direct the flow of liquid therein in a predetermined manner, as will hereinafter be set forth.

The selector valve includes an auxiliary valve in the nature of a by-pass conduit as a part thereof as is illustrated in Fig. 2 at 30. Such auxiliary valve is used for transferring fuel from one tank to another, during which time the supply to the engine is stopped. The auxiliary valve preferably embodies a cylinder, the ends of which are in direct communication with the recesses 16 and 18 of the selector 10. A piston 31 serves to control the flow of liquid through the by-pass and in the form shown in Fig. 2, the piston is in the open position and is held in such condition against the influence of a spring 32 which normally tends to move it to the closed position as shown by the broken lines 31a. The housing for the by-pass conduit may be attached to the side of the casting which forms the selector 10 in any suitable way.

The relationship of the various conduits leading to and from the main selector and of the valve members associated therewith is best illustrated in Figs. 4 to 8 inclusive. In these diagrams the by-pass conduit or auxiliary selector is shown for simplicity at the bottom of the main selector so as to bring the section through the two parts into a single plane thereof. In practice the by-pass selector is usually at the side of the main selector unit as illustrated in Fig. 2.

In Fig. 4 the valve seatings are such that fuel is supplied to an engine B from a tank A. The fuel flows directly from the tank, not shown, but having its discharge conduit indicated at A, through the valve casing to the engine, the pipe to which is indicated at B, the direct passage from A to B being indicated by the arrow line.

In Fig. 5 the engine is operated by fuel received from the tank A as well as by fuel flowing through a manifold M. As such manifold connection may be in communication with other tanks, the engine can receive fuel from any of a number of tanks.

Fig. 6 illustrates a valve seating wherein fuel is flowing from a tank into the manifold connection to the exclusion of the engine, while Fig. 7 shows the off-position of engine and tank, and Fig. 8 shows the flow of fuel from the manifold M to the engine B.

It will be seen that the engine may thus receive a supply of fuel either from its own associated tank or from any of the other tanks, depending upon the setting of the respective valves.

Referring now to Fig. 2, the mechanism for remotely controlling the position of the valve assembly in the selector 10 may be called a servo-motor and preferably comprises a pilot cylinder 40, in which a piston 41 is mounted for manual reciprocation. One end of the cylinder is connected by a conduit 42 to one end of the selector 10 through an opening in the wall 14, while the other end of the cylinder is connected as by a conduit 43 to the opposite end of the selector 10 through an opening in the wall 15. The space then between the outer faces of pistons 25 and 28, as well as the conduits 42 and 43, and all of the available space within the cylinder 40 are filled with a non-compressible fluid, such as oil, wherefore, any reciprocation of the piston 41 effects a simultaneous movement of the piston assembly in the selector 10. The sizes of the various parts are so chosen that within the limits of movement of the piston 41, the valve assembly in the selector 10 can be moved to distribute the flow of liquid, as illustrated in the diagrams 4 to 8, respectively.

A convenient arrangement for moving the piston 41 selectively embodies a hand lever 45 which is pivotally mounted at 46 on a bracket which may form an extension of the end wall 47 of the cylinder 40. The lever may be connected through a link 48 to the piston rod 49, while an indexing plunger 50, carried by the lever, may be urged by a spring 51 into engagement with spaced indentations on the periphery of the bracket sector 52. Such indentations may be designated as 1, 2, 0, 3, and 4, respectively, the "0" position constituting the "off" position as shown in Figs. 6 and 7, and as illustrated in Fig. 1.

When the lever 45 is in position "1," the valve assembly for selector 20 is in the position of Fig. 4. Position "2" corresponds to Fig. 5, and "0" position corresponds to Figs. 6 and 7. Position "3" corresponds to the broken line position of Fig. 5, in which case the intermediate piston 27 would be in the position shown for piston 26, while the piston 26 would be disposed opposite the entrance 70, to the by-pass conduit. Position "4" corresponds to that shown in Fig. 8.

Normally, as previously stated, the by-pass associated with each selector is held in closed position, such as is shown in broken lines in Fig. 2, and diagrammatically in Figs. 4, 5, 7, and 8. When, however, it is desired to open the by-pass so as to permit the flow of fuel, either from one of the tanks into the manifold line, or vice versa, then the rod 55 on which the piston 31 is mounted is moved axially against the force of the spring 32 until the piston 31 comes to a stop by a shoulder on the piston stem and clears the wall of its cylinder, at which time fuel may flow through the by-pass conduit in either direction desired.

Whenever the by-pass conduit is open, it is desirable that the engine associated therewith be shut off, as is shown diagrammatically in Fig. 6, at which time the lever 45 will be in "0" or central position shown in Fig. 1. Accordingly, to hold the by-pass valve in open position, I have shown a holding device in the form of a pin 60 which is adapted to be inserted through registering openings 71 and 72 in the bracket arm 35 and lever 45, respectively. The pin 60 may have a threaded passageway extending therethrough for receiving a threaded rod 61 which in turn is connected to the piston rod 55 by a flexible cord or wire 62. Such arrangement not only holds the by-pass valve in off position, the handle of which cannot be moved until the pin 60 has been pulled out.

In the normal operation, one tank will supply fuel to the engine without the necessity for utilizing fuel from the interconnecting manifold 22. However, in the event that the tank is put out of commission, the pilot is able immediately to shut off such tank and to connect another tank thereto by placing the valve lever 45 at position "4." Such valve lever and servo-motor are placed within easy reach of the pilot and the servo-motor is connected with the selector valve at any remote position in the plane. The directions of flow of fuel between the tanks and engine, or between the tanks to the exclusion of the engine is indicated by the arrows in Figs. 4, 5, 6 and 8.

To prevent the escape of liquid past any of the pistons used herein and at the same time to permit movement of the pistons beyond the sealing portion of the cylinder, and permit withdrawal into such portion without damaging the sealing material, I prefer to utilize a resilient ring 65 of the circular cross-section, as shown in Fig. 9, mounted in piston grooves 66, or within corresponding grooves in the end walls of the respective cylinders. The depth of each groove is such that when the parts are assembled, the ring is forced to assume an ellipsoidal shape, as shown in Fig. 10, but the width of the groove is greater than the longest cross-sectional dimension of the deformed ring so as to permit slight movement of the ring back and forth in the groove whenever the piston is moved. Such action tends to knead the material of which the ring is made and thereby to keep it alive. Moreover, since each piston is narrower than the width of the recess in the cylinder, each piston may move back and forth without affecting the ability of the ring to maintain a good seal.

In Figs. 11 and 12, I have shown a modification designed to prevent intermingling of gas and oil should there be a leakage past any of the packings of the multi-piston member. In these figures 10a indicates the valve casing having a discharge passageway 20a and two intake passageways 21a and 22a corresponding to the parts designated 10, 20, 21 and 22, in Fig. 1.

In the modification of Figs. 11 and 12, I have shown the multi-piston as a tubular member 80 having on its exterior four annular enlargements 81, 82, 83 and 84, each carrying a packing 85, of the character shown in Figs. 9 and 10, coacting with the interior surface of the casing. The casing has enlarged internal passageways 16a, 17a, and 18a, corresponding to passageways 16, 17 and 18 in Fig. 1, these passageways being of greater width than the packing and the annular enlargement carrying it, for the purpose already explained. The multi-piston therefore acts like the piston of Fig. 1 so far as controlling the valve ports is concerned.

The piston 80 is centrally divided internally by a transverse septum 86 to produce two open-ended cylinders 87 and 88. The casing 10a is provided with heads 14a and 15a. The annular spaces in the valve casing between the piston and the heads of the casing are vented to the atmosphere, such vents being indicated in Fig. 11 at 89.

Extending inwardly from each head 14a or 15a is a tubuluar extension 91 of smaller exterior than the interior of the piston cylinders. Each extension has an enlargement 92 at its inner end carrying packing 93 (of a character shown in Figs. 9 and 10) engaging the inner wall of the corresponding cylinder 87 or 88. Each of the extensions is tubular, having a bore 95 leading from the cylinder space 87 or 88 axially through the extension and the corresponding head 14a or 15a terminating in internally threaded enlargements 90. Conduits corresponding to the conduits 42 and 43 of Fig. 1 may thus be mounted in the heads and communicate through the bore 95 with the corresponding cylinder space within the piston.

It results from the construction just described that any oil leaking out of the chamber 87 or 88 past the piston packing 93 will flow into the vented annular chamber beyond the piston and thus out through the vents 89. Likewise any gasoline which leaks out of the chambers 96 or 97 will flow into the vented annular chambers. The arrangement thus prevents oil under pressure leaking into the gasoline chamber.

An important advantage of the present invention is the fact that the pilot can, independently of other members of his crew and without leaving his station, quickly control the flow of fuel to the engine from any one of a plurality of tanks, as an emergency situation or operating condition may require. Such control means may be located conveniently to the position of the operator irrespective of the remoteness of the tanks or engine from such position, and irrespective of the remoteness of the valves from such position. Thus, the valves may be disposed in substantially a direct line between the tanks and engine and, hence, the fuel lines may be greatly shortened. Reference is made to my copending application No. 9,889, filed February 20, 1948, as a division of my pending application No. 494,749, heretofore referred to, for claims relating to the valve mechanism herein disclosed.

I claim:

1. In a valve mechanism, the combination of a cylinder having a head at each end thereof and having a plurality of recesses arranged at spaced intervals therein, a hollow multiple piston slidably mounted in said cylinder, said piston having two cylinder-engaging portions disposed beyond the ends of the outermost recesses respectively and at least one cylinder-engaging portion disposed in the region between said recesses, said last-named portion having a width less than the width of either of the recesses, said portions having sealing means for automatically effecting a seal past the piston whenever said piston is disposed intermediate any two of said recesses, a tubular extension of smaller external diameter than the interior of the cylinder carried by one of the cylinder heads and extending into the interior of the piston, packing on the exterior of said extension coacting with the interior of the piston, and a vent from the annular space about the extension and between the piston and the head of the cylinder.

2. In a valve mechanism, the combination of a cylinder having a plurality of annular recesses at its inner periphery, a hollow piston in the cylinder having on its exterior a plurality of peripheral grooves, packing rings in said grooves adapted to coact with the cylinder wall and one or more of them adapted to register selectively with the recesses of the cylinder, said piston having an internal transverse partition dividing the hollow interior in the two outwardly facing cylindrical spaces, heads for the ends of said cylinder, each head carrying a longitudinal extension projecting into the interior of the adjacent cylindrical space within the piston, each extension terminating in a head packing carried by the said head coacting with the inner surface of the piston wall, there being a longitudinal opening through each extension leading through the head of the cylinder, and conduits connected to the cylinder heads and adapted to conduct fluid under pressure to pass through the cylinder heads and through the extensions to the interior of the piston, there being vents in the cylinder establishing engagement between the annular spaces around the extensions and the atmosphere.

3. In a valve mechanism, the combination of a cylinder having a plurality of recesses defining spaced annular cavities therein, a hollow member comprising an outer piston slidably mounted in the cylinder and having a plurality of peripheral grooves on the exterior surface thereof, a flexible packing ring in each groove for effecting a seal with the cylinder wall, heads for the ends of said cylinder, each head carrying a tapered extension projecting into the hollow member and each having an enlarged head on the inner end thereof, each head having a peripheral groove therein, a flexible packing ring in each of said grooves, each head providing an inner piston and the packing thereon operating to effect a seal against the inner surface of the outer piston, each extension having a passageway for fluid extending therethrough, and said cylinder having a vent adjacent each end thereof open to the atmosphere, each vent operating to permit escape from the cylinder of any fluid that seeps past the packing between the inner and outer pistons.

NIELS A. CHRISTENSEN.

REFERENCES CITED

The following references are of record in the file of this patent:

UNITED STATES PATENTS

| Number | Name | Date |
|---|---|---|
| 83,899 | Allison | Nov. 10, 1868 |
| 331,789 | Harvey | Dec. 8, 1885 |
| 852,802 | Sears | May 7, 1907 |
| 901,613 | Herrgott | Oct. 20, 1908 |
| 1,131,182 | Turner | Mar. 9, 1915 |
| 1,211,636 | Spray | Jan. 9, 1917 |
| 1,495,333 | Kruger | May 27, 1924 |
| 1,581,546 | Ranson | Apr. 20, 1926 |
| 1,658,810 | Machtolf | Feb. 14, 1928 |
| 2,172,981 | Maglott | Sept. 12, 1931 |
| 2,289,567 | Berglund | July 14, 1942 |
| 2,296,145 | Christensen | Sept. 15, 1942 |
| 2,316,944 | Ernst | Apr. 20, 1943 |
| 2,360,839 | Barksdale | Oct. 24, 1944 |

FOREIGN PATENTS

| Number | Country | Date |
|---|---|---|
| 246,460 | Italy | Mar. 23, 1926 |
| 560,948 | Germany | Oct. 8, 1932 |